United States Patent Office 3,647,775
Patented Mar. 7, 1972

3,647,775
N-ACYL-α-AMINO-ACID AMINES OR PEPTIDES AND THEIR PRODUCTION
Dieter Marquarding, Bonn, Ivar V. Ugi, Arzbach, Bad Tolz, Helmut Kleimann, Leverkusen, and Peter Hoffmann, Cologne-Stammheim, Germany, assignors to Farbenfabriken Bayer Aktiengesellschaft, Leverkusen, Germany
No Drawing. Filed Sept. 5, 1968, Ser. No. 757,778
Claims priority, application Germany, Sept. 25, 1967,
P 16 43 362.8
Int. Cl. C07c 103/02; C07f 11/00, 15/00
U.S. Cl. 260—112.5                                   7 Claims

ABSTRACT OF THE DISCLOSURE

Thickening agents for lacquers, plasticizers for polyvinyl chloride or antibiotic-like compounds are provided of the formula:

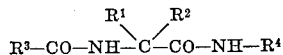

in which $R^1$ is hydrogen, hydrocarbon of up to 15 carbon atoms, said hydrocarbon substituted by halogen, keto, mercapto, alkylmercapto, carbalkoxy, hydroxy or azido, or said hydrocarbon having an O, S or N heteroatom, $R^2$ is hydrogen or alkyl of 1–4 carbon atoms, $R^3$ is hydrogen hydrocarbon of up to 20 carbon atoms, said hydrocarbon substituted by halogen, azido, nitro, carbalkoxy or protected amino, or said hydrocarbon having an N heteroatom and $R^4$ is alkyl, alkenyl, aralkyl or such substituted in the α-position by a carboxylic ester or carbonamido group, or aryl.

Metallocene derivatives are included such as ferrocenyl-alkyls or radicals containing other transition metals such as molybdenum or chromium.

---

The present invention provides new N-acyl-α-amino-acid amides or peptides and procedure for their production. The amides or peptides have both non-pharmaceutical and pharmaceutical or intermediate uses and as pharmaceuticals are administered like other antibiotics and in similar amounts and dosage forms.

It has now been found that an N-acyl-α-amino-acid amide or peptide of the Formula I:

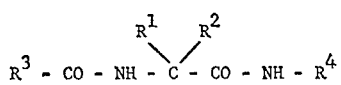

(I)

is obtained by reacting
(A) An amino compound of the Formula II:

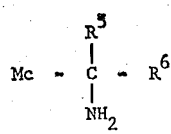

(II)

in which
$R^5$ and $R^6$ are each identical or different radicals, such as hydrogen, unsubstituted or substituted aliphatic or aromatic aryl radicals, or $R_5$ or $R_6$ is attached to the metallocene radical in a homo- or hetero-annular linkage, where
Mc denotes the radical

and in which
M is a transition metal,

is the cyclopentadienyl radical and
R is a further cyclopentadienyl radical or $(CO)_n$, where $n$ is an integer of 1 to 3,
simultaneously with
(B) A carbonyl compound of the Formula III:

$$R^1-CO-R^2 \qquad (III)$$

in which
$R^1$ in Formulas I and III is hydrogen or a hydrocarbon radical of up to 15 carbon atoms, unsubstituted or substituted by chlorine, or by keto, mercapto, alkylmercapto, carbalkoxy, hydroxy or azido groups with or without oxygen, sulfur or nitrogen hetero atoms, and
$R^2$ is hydrogen or a $C_1$–$C_4$ (lower) alkyl radical,
with
(C) A carboxylic acid of the Formula IV:

$$R^3-COOH \qquad (IV)$$

in which
$R^3$ is hydrogen or a hydrocarbon radical of up to 20 carbon atoms, unsubstituted or substituted by halogen, azido, nitro, carbalkoxy groups or by amino groups provided with protective groups and which may also contain a nitrogen heteroatom,
and with
(D) An isonitrile of the Formula V:

$$R^4-N{=}C \qquad (V)$$

in which
$R^4$ is an alkyl, alkenyl, aralkyl group unsubstituted or substituted in the α-position by a carboxylic acid ester or carbonamide group, or is an aryl group,
at a temperature between −70 and +80° C. in a solvent, isolating the resultant condensation product of the Formula VI:

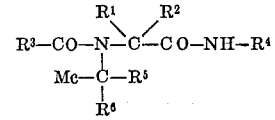

(VI)

in which
$R^1$ to $R^6$ and Mc have the same meaning as above,
and these
(E) In the temperature range from about −40 to about +50° C., optionally in the presence of an organic solvent, with an organic acid the acidity of which corresponds at least to formic acid or with hydrobromic acid in glacial acetic acid or with gaseous hydrogen chloride in a lower aliphatic alcohol, splitting off the protective group, and isolating the N-acyl-α-amino-acid derivative of the Formula I.

A particular advantage of the foregoing process, step (E) of which is preferably carried out in the temperature range from about 0 to about 25° C., is the elimination of the protective group which proceeds under extremely gentle or mild acid reaction conditions and in which, in contrast to an alkaline elimination, no racemization occurs.

The optionally substituted aliphatic radical ($R^5$, $R^6$) comprises straight-chain or branched alkyl radicals of 1–18 carbon atoms as well as cycloaliphatic radicals, preferably with 5 or 6 carbon atoms in the ring. The substituents of these aliphatic radicals include carbalkoxy with 1–8, preferably 1–4, carbon atoms, CN, as well as the phenyl radical which may be substituted by alkyl radicals (preferably 1–4 carbon atoms) or by carbalkoxy groups (preferably 1–4 carbon atoms).

The optionally substituted aromatic aryl radicals ($R^5$, $R^6$) are preferably the phenyl and the naphthyl radicals. The substituents of these radicals include alkyl (preferably 1–4 carbon atoms) and carbalkoxy (preferably 1–4 carbon atoms). In the case where $R^5$ or $R^6$ are attached to the metallocene radical in a homo- or hetero-annular linkage, this linkage takes place via 2 or 3 methylene groups.

With regard to the terms homo- or hetero-annular, reference may be made to the examples given in "Organo Metallic Compounds, vol. 1, "Compounds of Transition Metals," Springer Verlag 1966, pages 336–349." The transition metal M (see H. Remy, Lehrbuch der anorganischen Chemie, vol. II, page 9, Leipzig 1952) includes iron, ruthenium, osmium, vanadium, chromium, molybdenum, nickel, cobalt and tungsten. The transition metals preferred for the present process are iron, molybdenum and chromium. The organic acids used in step (E) of the process according to the invention must at least correspond to formic acid in respect of the acid strength. The formic acid used is preferably the commercial acid of about 98%. Further organic acids which are used for the process according to the invention are, besides the preferred formic acid, trifluoroacetic acid, trichloroacetic acid and p-toluene-sulfonic acid. When the process is carried out in the presence of an inert organic solvent, the usual, optionally chlorinated, aliphatic or aromatic hydrocarbons are used, such as methylene chloride, chloroform, carbon tetrachloride, hexachloroethane, hexane, benzene and toluene.

The following metallocenes illustrate suitable examples for use in carrying out the process of the invention:

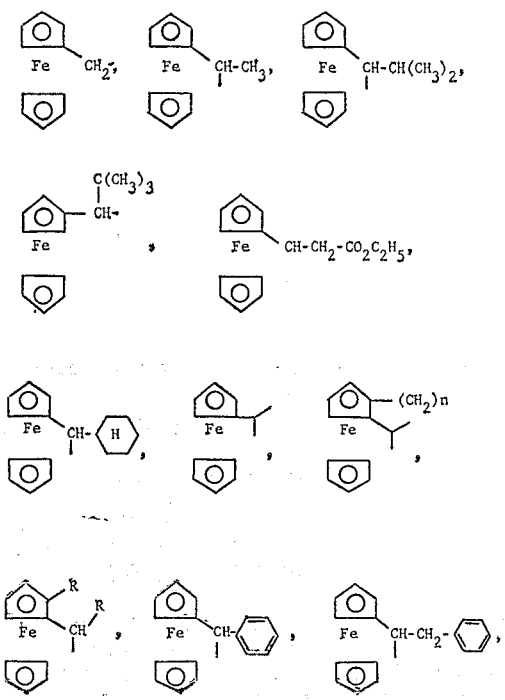
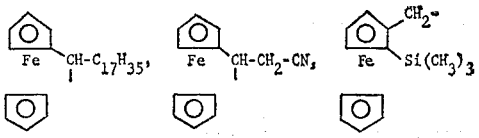

Suitable carbonyl compounds are, for example: formaldehyde, acetaldehyde, benzyloxy- and benzylmercaptoacetaldehyde, propionaldehyde, β-methylmercaptopropionaldehyde, β-carbethoxypropionaldehyde, n- and isobutyraldehyde, α-methyl-n-butyraldehyde, n- and isovaleraldehyde, α,β-diethylcrotonaldehyde, hexahydrobenzaldehyde, cyclohexene-3-aldehyde, glycidaldehyde, phenylacetaldehyde, p-hydroxyphenylacetaldehyde, hydrotropaldehyde, hydrocinnamaldehyde, benzaldehyde, p-chlorobenzaldehyde, vanillin, α- and β-naphthaldehyde, α-thiophenaldehyde, furfural, β-indolylacetaldehyde, azidoacetaldehyde, -propion-, -butyr-, -valer-, -capro-aldehyde, carbobenzoxy-amino- and -acetamino-acetaldehyde, acetone, methyl ethyl ketone, methyl amyl ketone, 3,4-dimethoxybenzyl methyl ketone, p-chloroacetophenone, cyclohexanone, β-tetralone.

Suitable carboxylic acid components are, for example: straight-chain or branched alkane-, cycloalkane-, haloalkane-, alkene, cycloalkene-, aralkyl-, aralkenyl- and aryl- carboxylic acids wherein the aryl can also be substituted; furthermore azidocarboxylic acids, hydroxycarboxylic acids and N-terminal-protected amine acids and peptides, suitable protective groups being acyl, alkoxycarbonyl, aryloxycarbonyl, arylsulfonyl, alkylsulfonyl, phthalyl, 1-methyl-2-carbethoxyethenyl groups, can be used.

In particular, the following compounds may be used: formic acid, acetic acid, chloroacetic acid, bromoacetic acid, trifluoroacetic acid, azidoacetic acid, propionic acid, lactic acid, n- and isobutyric acid, methacrylic acid, α-bromo-isovalerianic acid, lauric acid, stearic acid, phenylacetic acid, p-nitrocinnamic acid, benzoic acid, phthalic acid, monomethyl ester, nicotinic acid and particularly α-acylaminocarboxylic acids, such as formylglycine, trifluoroacetylglycine, tert.-butoxycarbonylglycine, carbobenzoxyglycine, phthalylglycine, acetylsarcosine, carbobenzoxyl-L-alanine, trifluoro-acetyl- or tert.-butoxycarbonylmethionine, formal-L- and D-valine, formyl-L-leucine, di-trifluoroacetylornithine, dicarbobenzoxy-lisine, N - carbobenzoxy - L - glutamic acid-α- or -γ-benzyl ester, carbobenzoxy - L - asparagine- and -L - glutamine, S - benzyl - N - carbobenzoxy - L - cysteine, carbobenzoxy - L - serine and -L-threonine, N-tert.-butoxycarbonyl - L - phenylalanine, N - trifluoroacetyl-L-phenylalanine, N - formyl - L - tyrosine, N-acetyl-D- and -L-triptophane, N-corbobenzoxy-N-nitro-L-arginine, N-carbobenzoxyhistidine, N - carbobenzoxy - L - proline and -hydroxyproline, carbobenzoxy- or phthalyl-glycyl-glycine, carbobenzoxy - L - alanyl - L - leucine, formyl-glycyl-valylglycine.

Examples of suitable isonitriles are: ethyl, n- and isopropyl-, allyl-, n- and tert.-butyl-, cyclohexyl-, cyclohexenyl-, benzyl, phenyl, 2,6-xylyl- and p-methoxyphenyl-isocyanide, isocyanoacetic acid-tert.-butyl ester, D,L- and L-α-isocyanoisovalerianic acid methyl and ethyl ester, α-isocyano-γ-methylvalerianic acid methyl and tert.-butyl ester, N-α-isocyano-isovaleryl-valine methyl ester.

Solvents which are suitable for the process according to the invention are, for example: methanol, ethanol, butanol, methylene glycol, ethylene glycol, dimethylformamide, formamide, acetonitrile, methylene chloride, chloroform, benzene, toluene, ethyl acetate, tetrahydrofuran, dioxan and diethyl ether.

In general, the process is carried out by combining approximately equivalent amounts of the amine, the ketone, the carboxylic acid and the isonitrile in one of the aforesaid solvents at temperatures between −70 and +80° C. The amine and the ketone may be also used in the form of the Schiff's base obtained from these two components.

The intermediate compound is usually isolated by evaporation of the solvent in a vacuum and recrystallization. The isolated intermediate can then be dissolved, for example, in one of the aforesaid solvents, and treated with a lower aliphatic alcohol at temperatures between −40 and +50° C.

In the case where optically active amine components are used, it is possible, by selecting suitable reaction conditions which strongly depend on the reaction under consideration, to conduct the reaction in such a manner that, due to asymmetrical induction, only one of the possible diastereomeric final products is preferably formed.

The obtained N-acyl-α-amino-acid amides or peptides can be used, for example, as thickening agents for lacquers or as plasticizers for polyvinyl choride. Especially they are useful for the preparation of natural and synthetic peptides of importance, which can have antibiotic properties such as Bottromycin. Bottromycin B. which according to S. Nakamure, T. Chikaike, H. Yonehara and H. Umezawa [J. Antibiotics 18, 60 (1965)] has the following structure:

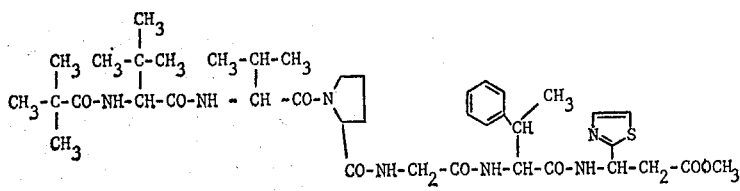

can be synthesized as follows:

There are condensed formic acid, a Schiff base of hydratropaldehyde and an amine of the type

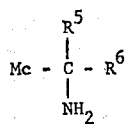

in which Mc, $R^5$ and $R^6$ have the meanings given above, as well as

β-(2-thiazolyl)-2-isocyanopropionic acid methyl ester to form the peptide derivative

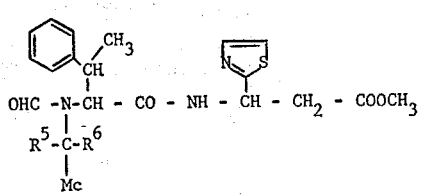

There is separated the formylpeptide which contains the β-phenyl-α-aminobutyric acid existing in the Bottromycin, is split off the metallocene residue

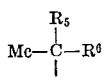

according to the process of the invention and is then prepared the corresponding isocyanopeptide

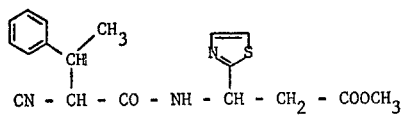

The condensation of pivalic acid, a Schiff base of pivalaldehyde and an amine of the type

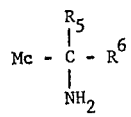

as well as the isonitrile

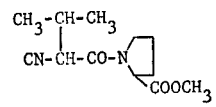

yields the secondary amine

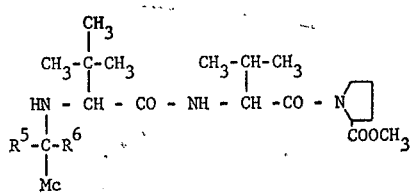

which after splitting off the residue

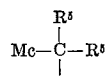

with the aid of silica gel/inorganic acid, forms subsequent to acylation with pivaloyl chloride and saponification of the esters, the peptide carboxylic acid

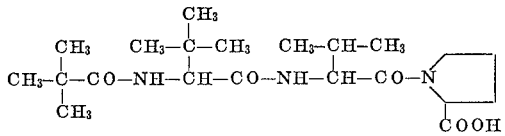

This acid, an amine of the type

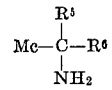

formaldehyde and the isocyanopeptide produced by condensation are condensed to a product from where there is obtained Bottromycin B after splitting off the residue

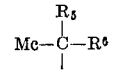

according to the process of the invention.

EXAMPLE 1

(a) Preparation of the two diastereomeric N-benzoyl-N-α-ferrocenylethyl-valine-N′-tert.-butylamide 10 g. of isobutyraldehyde-N-α-ferrocenyl - ethylimine, prepared in the usual manner from α-ferrocenylethylamine and isobutyraldehyde, and 4.3 g. of benzoic acid are dissolved in 21.1 g. of methanol. 3.5 ml. of tert.-butyl-isonitrile are added dropwise at 20° C. while stirring. After 1 hour, the solvent is evaporated in a vacuum at a bath temperature of 35° C., the residue is dissolved in chloroform, mixed with 15 g. of silica gel (0.05–0.20 mm., Merck) and evaporated to dryness in a vacuum. The product adsorbed on silica gel is placed on a column charged with 350 g. of silica gel and eluted with cyclohexane/ethyl acetate (5+2).

There are obtained 6.0 g. of N-benzoyl-N-α-ferrocenyl-ethyl - valine-N'-tert.-butylamide (M.P. 147–148.5° C. from petroleum ether, R_f 0.5 on DC-plates coated with silica gel G [Merck]), and 4.2 g. of N-benzoyl-N-α-ferrocenylethyl-valine-N'-tert.-butylamide (M.P. 192–194° C. from petroleum ether, R_f 0.3). The total yield of the two diastereomeric valine derivatives amounts to 57.5% of theory.

(b) Splitting off the protective group (1) With trifluoroacetic acid.—500 mg. of the nonpolar N - benzoyl-N-α-ferrocenylethyl-valine-N'-tert.-butylamide (M.P. 147–148.5° C.) are taken up with 10 ml. of trifluoroacetic acid. The reaction mixture is allowed to stand at 20° C. for 1 hour, then poured on to ice, the solution is rendered weakly alkaline by means of an aqueous sodium carbonate solution and shaken with ether. After drying over Na_2SO_4, the product is concentrated in a vacuum, the residue is digested with petroleum ether (60–80° C.) and the undissolved N-benzoyl-valine-N'-tert.-butylamide of the formula:

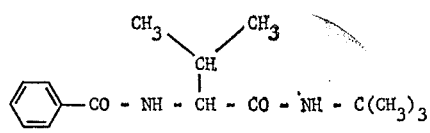

is filtered off.

Yield: 280 g. (99% of theory); M.P. 233–234° C. (Lit. melting point 237° C.) [German published specification No. 1,212,552, Farbenfabriken Bayer AG, inventor: I, Ugi, K. Offermann, 26. 11. 1963, 17. 3. 1966].

Analogously, there are obtained from 500 mg. of N-benzoyl - N-α-ferrocenyl-valine-N'-tert.-butylamide (M.P. 192–194° C.), 260 mg. of N-benzoyl-valine-N'-tert.-butylamine (92% of theory), M.P. 236–239° C.

(2) With formic acid from optically active valine derivative.—500 mg. of N-benzoyl-N-(R)-α-ferrocenylethyl-(R)-valine-N'-tert.-butylamide (M.P. 144–145° C., the racemate melts at 192–194° C.) were dissolved in 5 ml. of formic acid. After 1 hour, the mixture is poured into water, neutralized wtih aqueous bicarbonate solution and extracted with ether, the ether phase washed with water, dried with sodium sulfate and concentrated. The residue is recrystallized from isopropanol. Yield: 300 mkg. (94% of theory), M.P. 233–234° C., $[\alpha]_D^{20} = +60.0°$ (c.=2.0, CH_3COOH—CHCl_3 1:1). Lit.: I Ugi and K. Offermann, Chem. Ber. 97, 296 (1964). $[\alpha]_D^{20} = -60.9°$ for the enantiomer.

(3) With silica gel/hydrochloric acids.—0.41 g. of N-benzoyl-N-α-ferrocenylethyl valine - N' - tert. - butylamide (M.P. 147–148.7° C.) were dissolved in 5 ml. of benzene and 1.54 g. of silica gel (0.05–0.20 mm., Merck) mixed, which has previously been evaporated to dryness with 1.5 ml. of 2 N HCl. This is allowed to stand at room temperature for 30 minutes, the silica gel then suction filtered and washed several times with benzene. The substance is eluted from the silica gel with methanol. The solution is concentrated and the residue crystallized from isopropanol. Yield: 200 mg. (76.4% of theory). M.P. 237–238° C.

EXAMPLE 2

(a) Preparation of the two diastereomers of N-benzoyl-N - 2 - trimethylsilyl-ferrocenylmethyl valine-N'-tert.-butylamide

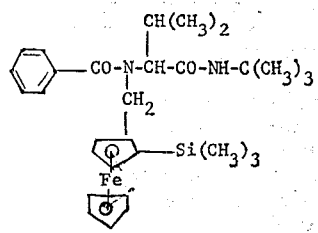

To 0.97 g. of isobutyraldehyde - 2 - trimethylsilyl-ferrocenyl methyl-imine were, together with 0.347 g. of benzoic acid dissolved in 135 g. of methylene chloride, added dropwise at −60° to −70° C., 1 ml. of tert.-butylisonitrile. After 5 hours the reaction mixture is added to water and shaken with methylene chloride, which is then washed with 2% phosphoric acid and then with 2 N NaOH. The methylene chloride phase is dried with Na_2SO_2 and after filtration evaporated in a vacuum. The residue is dissolved in a little benzene-5%-acetone and added to a silica gel (0.05–0.20 mm., Merck) filled column and eluted with benzene-5%-acetone.

There are obtained 320 mg. of N-benzoyl-N-2-trimethylsilylferrocenyl valine-N-tert.-butylamide (M.P. 142–143.5° C. from methanol, R_f 0.7 for DC from silica gel in benzene-5%-acetone) and 920 mg. of N-benzoyl-N-2-trimethylsilylferrocenylmethyl - valine - N' - tert.-butylamide (M.P. 166–166.5° C. from cyclohexane, R_f 0.6). The total yield of both diastereomeric valine derivatives amounts to 80.0% of theory.

(b) Splitting off protective group 300 mg. of N - benzoyl-N-2-trimethylsilylferrocenylmethyl valine - N' - tert. - butylamide (M.P. 166–166.5°) are dissolved in 5 ml. of benzene and mixed with 2.5 g. of silica gel (0.05–0.20 mm., Merck) which has previously been evaporated to dryness with 2.5 ml. of HCl. After standing 30 minutes at room temperature it is suction filtered and the silica gel washed with benzene until the filtrate becomes colorless. The silica gel is then eluted with methanol, after which the methanol is distilled off and the residue recrystallized from isopropanol. Yield: 130 mg. (84.4% of theory). M.P. 235.5–237° C.

The isobutyraldehyde - 2 - trimethylsilylferrocenylmethylimine used in the reaction is prepared in the following manner:

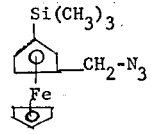

238 g. of N-(2 - trimethylsilylferrocenylmethyl)-N,N-dimethylammonium iodide (prepared according to G. Marr, J. organometallic Chem. 9, 147–151 (1967)) are dissolved in a mixture of 1.2 l. of glycol dimethyl ether and 800 ml. of water after which 238 g. of sodium azide are added and the reaction mixture stirred for 2 hours at 100° C. Then there is added a large amount of water and shaking with chloroform is carried out and subsequently the chloroform phase is dried with Na_2SO_4 and concentrated. The residue is further worked up immediately. Yield: 144 g. (88% of theory). IR.: Azide band at 2100 cm.^−1.

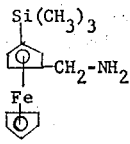

12.5 g. of trimethylsilylferrocenylmethyl azide are dissolved in 300 ml. of glycolamino methyl ester. There is added dropwise at 25° C. a solution of 14 g. of tin-(II)-chloride and 35 g. of water. When no more nitrogen evolves, the reaction mixture is added to water. This is shaken with chloroform, the organic phase washed with water dried with Na₂SO₄ and concentrated. The residue is distilled in vacuum. Kp.₀.₀₃ 93–97° C. Yield: 7.5 g. (65% of theory).

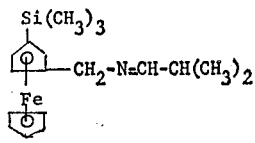

4.9 g. of 2 - trimethylsilylferrocenylmethylamine are dissolved in 15 ml. of methylene chloride. 1.23 g. of isobutyraldehyde are added dropwise at 0° C. The reaction mixture is allowed to stand overnight at 0° C. The separated water is removed with Na₂SO₄, the filtrate concentrated in a vacuum. The residue is distilled in a vacuum. Kp.₀.₀₅ 106–108° C. Yield: 5.1 g. (89% of theory).

EXAMPLE 3

(a) Preparation of N - α - ferrocenylethyl - N - phenoxyacetyl - 1 - aminocyclohexane carboxylic acid - N'-carbethoxymethylamide

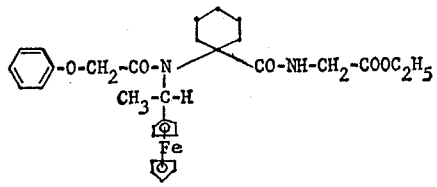

11.5 g. of α-ferrocenylethyl amine and 4.9 g. of cyclohexanone are dissolved in 30 ml. of methylene chloride and to this solution there is added dropwise a solution of 7.5 g. of phenoxy acetic acid in 50 ml. of methanol. There is then added slowly at room temperature 5.7 g. of isocyanoacetic acid ethyl ester dissolved in 10 ml. of methanol. After 4 days the reaction mixture is poured into 250 ml. of water, shaken with methylene chloride, the organic phase dried with Na₂SO₄ and concentrated in a vacuum. The residue crystallizes after a few days, the crystal slurry is digested with hot cyclohexane and the crystals suction filtered. Yield: 19.0 g. (63% of theory, calculated on the starting α-ferrocenylethyl amine). M.P. 119.5°–120.5° C.

(b) Splitting off protective group

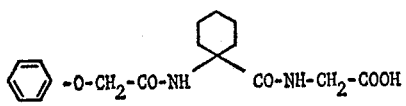

2 g. of N - α - ferrocenylethyl - N - phenoxyacetyl-1-aminocyclohexane carboxylic acid - N' - carbethoxymethyl amide are dissolved in 10 ml. of 98% formic acid. After 45 minutes the mixture is added to 150 ml. of water, neutralized with aqueous NaHCO₃-solution and shaken with ether. The ether phase is concentrated, the residue is taken up in 2 N NaOH and heated for 2 hours at 50° C. The non-polar ferrocene portion is shaken with chloroform and the aqueous phase acidified with concentrated HCl and shaken several times with chloroform, the combined chloroform phases dried with Na₂SO₄ and then concentrated. The residue is dissolved in benzene, then poured into a large amount of petroleum ether and the precipitated crystals are suction filtered. Yield: 1.0 g. (88% of theory). M.P. 159–160° C. The methyl ester melts at 86–87° C.

EXAMPLE 4

(a) Preparation of the four diastereomers of N-benzoyl-N - α - ferrocenylethyl - 3 - methyl - 3 - phenylalanine-N'-tert.-butylamide

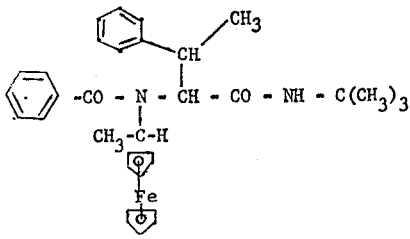

14.7 g. of hydratropaldehyde - N - (S) - α - ferrocenylethyl imine (Kp.₀.₃₅ 182° C.) prepared in the usual manner from hydratropaldehyde and (S) - α - ferrocenylethyl amine ([α]_D²⁰ —20.6°), and 5.2 g. of benzoic acid are dissolved in 27.7 g. of methanol. 4.26 ml. of tert.-butylisonitrile are added dropwise under stirring at room temperature. After 5 hours the reaction mixture is concentrated in a vacuum and the diastereomers separate on a silica gel column by elution with petroleum ether-25% ethyl acetate. The single diastereomers 3 - methyl - 3-phenylalanine derivatives cannot be obtained in crystalline form. Their R_f values on DC-plates coated with silica gel G (Merck) are when petroleum ether-25% ethyl acetate as coating medium is used:

| Diastereomer | R_f |
| --- | --- |
| I | 0.55 |
| II | 0.37 |
| III | 0.25 |
| IV | 0.17 |

(b) Splitting off the protective group

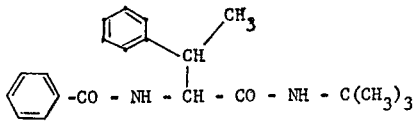

(1) 400 mg. of the diastereomer I are taken up in 5 ml. of formic acid and let stand at room temperature for 1 hour. Then the mixture is poured in water, neutralized with 10% soda solution and shaken with ether. The ether phase is washed with water, dried and concentrated in a vacuum. The residue is digested with boiling petroleum ether and is filtered after cooling. The remaining solid residue is recrystallized from petroleum ether. Yield: 170 g. (69% of theory), M.P. 273° C.,
(c.=0.84, benzene-methanol 4:1).

$[\alpha]^{20}_{365}$ —151.0°

(2) 500 mg. of the diastereomer II give similarly 210 mg. of N - benzoyl-3-methyl-3-phenylalanine - N' - tert.-butylamide (68.5% of theory), M.P. 229–230° C. (isopropanol), $[\alpha]^{20}_{365}$ —23.1°

(c.=0.82 benzene-methanol 4:1).

(3) 210 mg. of the diastereomer III give similarly 90 mg. of N-benzoyl-3-methyl-3-phenylalanine - N' - tert.-butylamide (69.8% of theory), M.P. 274° C. (isopropanol), $[\alpha]^{20}_{365}$ —150.0°

(c.=0.80, benzene-methanol 4:1).

(4) 500 mg. of the diastereomer IV give similarly 200 mg. of N-benzoyl-3-methyl-3-phenylalanine - N' - tert.-butylamide (65.5% of theory), M.P. 228–229° C. (isopropanol), $[\alpha]^{20}_{365}$ +23.0° C.

(c.=0.80, benzene-methanol 4:1).

What is claimed is:
1. A compound of the formula:

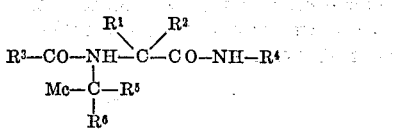

in which

R¹ is hydrogen hydrocarbon selected from the group consisting of straight or branched alkyl of 1 to 15 carbon atoms, straight or branched chain alkenyl of up to 15 carbon atoms, cyclohexyl, cyclohexenyl, phenyl, phenylloweralkyl, and naphthyl, or said hydrocarbon substituted by chloro, keto, mercapto, lower alkylmercapto, lower alkoxy, carboloweralkoxy, hydroxy, R² is hydrogen or alkyl of 1–4 carbon atoms, or R¹ and R² together with the carbon atom to which they are attached form cyclohexylene, R³ is hydrogen, straight or branched alkyl of 1 to 20 carbon atoms, straight or branched chain alkenyl of up to 20 carbon atoms, pehnyl, phenylloweralkyl or phenoxyloweralkyl, unsubstituted or substituted by halogen, hydroxy, azido, nitro or carboloweralkoxy, or R³ contains up to 20 carbon atoms and is the residue of an α-amino acid or a di- or tri-peptide, the terminal amino of which being substituted by trifluoroacetyl formyl, acetyl, lower alkoxycarbonyl, carbobenzoxy or phthalyl, R⁴ is hydrocarbon selected from the group consisting of lower alkyl, lower alkenyl, cyclohexyl, cyclohexenyl and benzyl, or said hydrocarbon substituted in the α-position by carboloweralkoxy or carbonamido, or R⁴ is phenyl, unsubstituted or substituted by lower alkyl or lower alkoxy, or R⁴ is

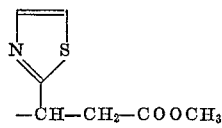

R⁵ and R⁶ are the same or different and are hydrogen, hydrocarbon selected from the group consisting of straight or branched chain alkyl of 1 to 18 carbon atoms and cycloalkyl of 5 or 6 carbon atoms, or said hydrocarbon substituted by carbalkoxy of 1 to 8 carbon atoms, cyano, phenyl, phenyl substituted by alkyl of 1 to 4 carbon atoms or phenyl substituted by carbalkoxy of 1 to 4 carbon atoms or R⁵ and R⁶ are phenyl or naphthyl, or cycloalkyl of 5 or 6 carbon atoms, unsubstituted or substituted by carbalkoxy of 1 to 8 carbon atoms, cyano, phenyl, phenyl substituted by alkyl of 1 to 4 carbon atoms or phenyl substituted by carbalkoxy of 1 to 4 carbon atoms or R⁵ and R⁶ are phenyl or naphthyl, unsubstituted or substituted by alkyl of 1 to 4 carbon atoms or carbalkoxy of 1 to 4 carbon atoms, Mc is

in which
M is a transition metal,

is cyclopentadienyl,
and
R is cyclopentadienyl or (CO)ₙ
wherein n is 1, 2 or 3.

2. A compound according to claim 1 where M is iron, molybdenum or chromium.

3. The compound of claim 1 which is N-benzoyl-N-α-ferrocenyl-ethyl-valine-N'-tert.-butylamide or a diastereomer thereof.

4. The compound of claim 1 which is N-α-ferrocenylethyl - N - phenoxy - acetyl - 1 - amino - cyclohexane carboxylic acid-N'-carbethoxy-methylamide.

5. The compound of claim 1 which is N-benzoyl-N-α-ferrocenylethyl - 3 - methyl - 3 - phenylalanine-N'-tert.-butylamide or a diastereomer theroef.

6. The compound of the following structure

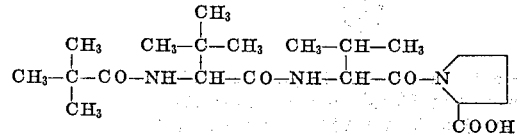

7. In a process for the production of an N-acyl-α-amino-acid amide or peptide of the formula:

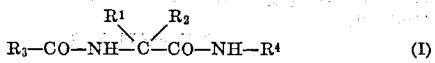

wherein
(A) an amino compound,
(B) a carbonyl compound of the formula:

$$R^1\text{---}CO\text{---}R^2 \qquad (III)$$

in which
R¹ is hydrogen, hydrocarbon selected from the group consisting of straight or branched alkyl of 1 to 15 carbon atoms, straight or branched chain alkenyl of up to 15 carbon atoms, cyclohexyl, cyclohexenyl, phenyl, phenylloweralkyl, and naphthyl, or said hydrocarbon substituted by chloro, keto, mercapto, lower alkylmercapto, lower alkoxy, carboloweralkoxy, hydroxy, or azido or R¹ is glycidyl, thiophen or furfuryl, and
R² is hydrogen or alkyl of 1–4 carbon atoms, or R¹ and R² together with the carbon atom to which they are attached form cyclohexylene,
(C) a carboxylic acid of the formula:

$$R^3\text{---}COOH \qquad (IV)$$

in which
R³ is hydrogen, straight or branched alkyl of 1 to 20 carbon atoms, straight or branched chain alkenyl of up to 20 carbon atoms, phenyl, phenylloweralkyl or phenoxyloweralkyl, unsubstituted or substituted by halogen, hydroxy, azido, nitro or carboloweralkoxy or R³ is nicotinyl, or R³ contains up to 20 carbon atoms and is the residue of an α-amino acid or a di- or tri-peptide, the terminal amino of which being substituted by trifluoroacetyl, formyl, acetyl, lower alkoxycarbonyl, carbobenzoxy or phthalyl, and
(D) an isonitrile of the formula:

$$R^4\text{---}N\text{=}C \qquad (V)$$

in which
R⁴ is hydrocarbon selected from the group consisting of lower alkyl, lower alkenyl, cyclohexyl, cyclohexenyl and benzyl, said hydrocarbon substituted in the α-position by carboloweralkoxy or carbonamido, or R⁴ is phenyl unsubstituted or substituted by lower alkyl or lower alkoxy, or R⁴ is

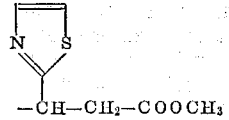

are simultaneously condensed at a temperature between −70 and +80° C. in a solvent to form a condensation product, the improvement which comprises using as the amino compound an amino compound of the formula

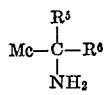  (II)

wherein

R⁵ and R⁶ are the same or different and are hydrogen, hydrocarbon selected from the group consisting of straight or branched chain alkyl of 1 to 18 carbon atoms and cycloalkyl of 5 or 6 carbon atoms, or said hydrocarbon substituted by carbalkoxy of 1 to 8 carbon atoms, cyano, phenyl, phenyl substituted by alkyl of 1 to 4 carbon atoms or phenyl substituted by carbalkoxy of 1 to 4 carbon atoms or R⁵ and R⁶ are phenyl or naphthyl, unsubstituted or substituted by alkyl of 1 to 4 carbon atoms or carbalkoxy of 1 to 4 carbon atoms, Me is

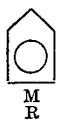

wherein

M is a transition metal,

is cyclopentadienyl and

R is cyclopentadienyl or (CO)$_n$, where $n$ is an integer of 1 to 3, recovering a condensation product of the formula:

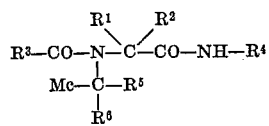

in which

R¹ to R⁶ and Mc have the same meaning as above, contacting said recovered condensation product, in the temperature range of about −40 to about +50° C., with an organic carboxylic acid having an acidity not less than that of formic acid, para-toluene sulfonic acid, hydrobromic acid in glacial acetic acid or gaseous hydrogen chloride in a lower aliphatic alcohol, thereby splitting off the protective group,

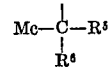

and recovering the N-acyl-α-amino-acid derivatives of the Formula I.

References Cited

UNITED STATES PATENTS 3,238,185   3/1966   Neuse _____ 260—80

FOREIGN PATENTS 1,415,229   9/1965   France _____ 260—112.5

OTHER REFERENCES

Nakamura et al., J. Antibiotics, Ser. A, 18, 60–61 (1965).

Nakamura et al., J. Antibiotics, Ser. A, 19, 10–12 (1966).

Schlogl, Monatsch. Chem. 88, 601–621 (1957).

LEWIS, GOTTS, Primary Examiner

M. KASSENOFF, Assistant Examiner

U.S. Cl. X.R.

260—30.2, 30.4, 30.8, 32.6 295.5, 326.14, 332.2, 347.3, 348, 349, 429, 438.5, 439, 464, 465, 465.4, 468, 471, 481, 482, 557, 558, 559, 561, 562, 302, 326.3

UNITED STATES PATENT OFFICE
CERTIFICATE OF CORRECTION

Patent No. 3,647,775      Dated March 7, 1972

Inventor(s) Dieter Marquarding et al

It is certified that error appears in the above-identified patent and that said Letters Patent are hereby corrected as shown below:

Column 2, line 10, the formula "  " should be --  --
                                           M
                          R Column 11, line 16, after "hydroxy" and before the comma insert -- or azido --

Column 11, line 22, change "pehnyl" to -- phenyl --

Signed and sealed this 30th day of January 1973.

(SEAL)
Attest:

EDWARD M. FLETCHER, JR.
Attesting Officer

ROBERT GOTTSCHALK
Commissioner of Patents